United States Patent
Kim

(10) Patent No.: US 8,851,242 B2
(45) Date of Patent: Oct. 7, 2014

(54) ELECTROMECHANICAL BRAKE

(71) Applicant: Mando Corporation, Pyeongtaek-si (KR)

(72) Inventor: Jin Seok Kim, Suwon-si (KR)

(73) Assignee: Mando Corporation, Gyeonggi-Do (KR)

( * ) Notice: Subject to any disclaimer, the term of this patent is extended or adjusted under 35 U.S.C. 154(b) by 34 days.

(21) Appl. No.: 13/667,984

(22) Filed: Nov. 2, 2012

(65) Prior Publication Data

US 2013/0153342 A1 Jun. 20, 2013

(30) Foreign Application Priority Data

Nov. 2, 2011 (KR) .................... 10-2011-0113250

(51) Int. Cl.
*F16D 55/08* (2006.01)
*F16D 65/18* (2006.01)
*B60T 13/74* (2006.01)

(52) U.S. Cl.
CPC ............... *B60T 13/741* (2013.01); *F16D 65/18* (2013.01)
USPC .......................... 188/72.1; 188/72.8; 188/156

(58) Field of Classification Search
USPC ................... 188/72.1, 72.2, 72.3, 72.7, 72.8, 188/156–158, 161, 162; 475/162, 169, 170, 475/175, 900

See application file for complete search history.

(56) References Cited

U.S. PATENT DOCUMENTS

| | | | | |
|---|---|---|---|---|
| 4,850,457 A | * | 7/1989 | Taig | 188/72.1 |
| 6,367,592 B1 | * | 4/2002 | Kapaan et al. | 188/72.1 |
| 6,491,140 B2 | * | 12/2002 | Usui et al. | 188/72.1 |
| 6,814,190 B1 | * | 11/2004 | Olschewski et al. | 188/72.8 |
| 6,845,852 B2 | * | 1/2005 | Yokoyama et al. | 188/72.8 |
| 6,880,680 B2 | * | 4/2005 | Watanabe et al. | 188/72.8 |
| 8,051,957 B2 | * | 11/2011 | Giering et al. | 188/72.8 |

FOREIGN PATENT DOCUMENTS

| | | | | |
|---|---|---|---|---|
| JP | 2010038307 A | * | 2/2010 | |
| KR | 101041553 B1 | * | 6/2011 | |
| WO | WO-03/044390 A1 | | 5/2003 | |

* cited by examiner

*Primary Examiner* — Pamela Rodriguez
(74) *Attorney, Agent, or Firm* — McDermott Will & Emery LLP

(57) ABSTRACT

An electromechanical brake includes a pair of pad plates provided with a friction pad to apply pressure to a disc, a carrier to support the pad plates, a caliper housing supported movably back and forth on the carrier to apply pressure to the pad plates; and a presser to apply pressure to the pad plates. The presser includes a pressing member to apply pressure to one of the pad plates, a driving motor to operate the pressing member, a gear assembly disposed between the driving motor and the pressing member to transfer rotational force of the driving motor to the pressing member. The gear assembly includes an input shaft connected to a motor, an external gear coupled to the input shaft such that the external gear eccentrically rotates, and a stationary internal gear and a rotational internal gear meshed with the external gear such that the external gear revolves, while rotating. The rotational internal gear includes an output shaft in the center thereof and the output shaft is connected to the pressing member.

3 Claims, 4 Drawing Sheets

ELECTROMECHANICAL BRAKE

CROSS-REFERENCE TO RELATED APPLICATION

This application claims the benefit of Korean Patent Application No. P2011-0113250, filed on Nov. 2, 2011 in the Korean Intellectual Property Office, the disclosure of which is incorporated herein by reference.

BACKGROUND

1. Field

Embodiments of the present invention relate to an electromechanical brake. More specifically, embodiments of the present invention relate to an electromechanical brake using a gear and a motor.

2. Description of the Related Art

In general, a brake system is a brake apparatus that decelerates or stops a running vehicle and, at the same time, maintains a parked state.

The brake is commonly a friction brake. The friction brake performs a braking function when a disc that rotates together with a wheel is pressed by an oil pressure from pads provided at both sides of the disc. Meanwhile, a hydraulic brake strongly pushes the pad toward the disc using an oil pressure during braking. For this reason, the hydraulic brake has a complicated configuration including a booster to reinforce a pedal operation force, a master cylinder to form an oil pressure, an oil pressure line, a wheel cylinder and a variety of equipment to control and aid these elements. Due to such a complicated configuration, there is limitation of reinforcement of reliability, stability and the like to some extent.

In this regard, recently, an electro-mechanical brake (EMB) in which a simple configuration and reliability in brake performance that are lacking in the hydraulic brake is used. In brief, an EMB is an apparatus for obtaining braking force through a motor, which performs a braking function using a presser that presses a motor, a gear assembly as a decelerator and a pad toward the disc.

However, a conventional EMB has a relatively low efficiency and slow response, as compared to a hydraulic brake. While a brake operates, application of electric current to the motor is required. For this reason, a structure that has motor durability and prevents rotation of the presser is required. Also, in order to increase deceleration between the motor and the presser, a large gear assembly is disadvantageously required.

SUMMARY

Therefore, it is one aspect of the present invention to provide an electromechanical brake that is compact and exhibits superior response and efficiency.

Additional aspects of the invention will be set forth in part in the description which follows and, in part, will be obvious from the description, or may be learned by practice of the invention.

In accordance with one aspect of the present invention, provided is An electromechanical brake including: a pair of pad plates provided with a friction pad to apply pressure to a disc; a carrier to support the pad plates; a caliper housing supported movably back and forth on the carrier to apply pressure to the pad plates; and a presser to apply pressure to the pad plates, wherein the presser includes: a pressing member to apply pressure to one of the pad plates; a driving motor to operate the pressing member; a gear assembly disposed between the driving motor and the pressing member to transfer rotational force of the driving motor to the pressing member, wherein the gear assembly includes: an input shaft connected to a motor; an external gear coupled to the input shaft such that the external gear eccentrically rotates; and a stationary internal gear and a rotational internal gear meshed with the external gear such that the external gear revolves, while rotating, wherein the rotational internal gear includes an output shaft in the center thereof and the output shaft is connected to the pressing member.

The rotational internal gear may have the same diameter as that of the stationary internal gear and may have a smaller tooth number than that of the stationary internal gear.

The gear assembly may further include a stationary internal gear housing coupled to the stationary internal gear, and the rotational internal gear may be mounted rotatably between the stationary internal gear and the stationary internal gear housing.

The pressing member may further include: a ball nut mounted movably back and forth on the caliper housing; and a rotational member spirally coupled to the ball nut and connected to the output shaft of the rotational internal gear.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, preferred embodiments of the present invention will be described with reference to the accompanying drawings.

Figure 1:
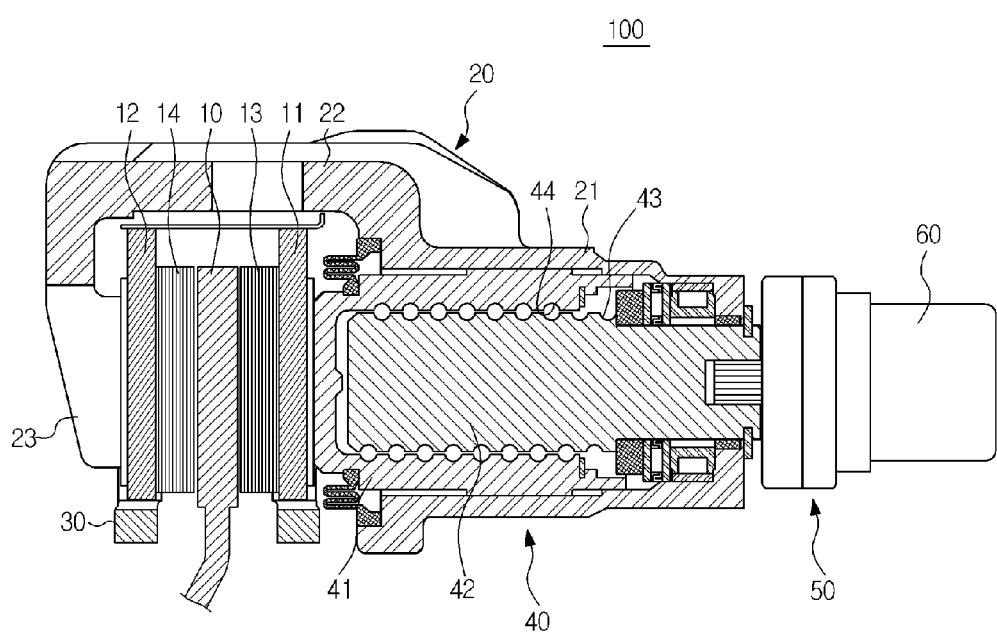
FIG. 1 is a sectional view illustrating an electromechanical brake according to one embodiment of the present invention.

FIG. 1 is a sectional view illustrating an electromechanical brake according to one embodiment of the present invention. As shown in FIG. 1, the electromechanical brake 100 according to one embodiment of the present invention includes a disc 10 that rotates together with wheels of a vehicle, a pair of pad plates 11 and 12 disposed at both sides of the disc 10, to apply pressure to both sides of the disc 10 and thereby perform braking, wherein first and second friction pads 13 and 14 are adhered to the pad plates, a caliper housing 20 to apply pressure to the pair of pad plates 11 and 12, and a presser 40 provided on the caliper housing 20 to perform a braking operation.

The pair of pad plates 11 and 12 are supported on a carrier 30 fixed on a vehicle body such that pad plates 11 and 12 move back and forth, in order to move the first and second friction pads 13 and 14 back and forth toward both sides of the disc 10.

The caliper housing 20 includes an empty body 21, an extension member 22 that extends from the body 21 toward the outside pad plate 12 among the pair of pad plates, and a finger 23 connected to the extension member 22 to support the rear surface of the outside pad plate 12. The presser 40 is mounted on the body 21 of the caliper housing 20 to apply pressure to the inner pad plate 11 among the pair of pad plates 11 and 12.

The presser 40 includes a ball nut 41 as a pressing member that is mounted movably back and forth in the body 21 of the caliper housing 20, to press and un-press the inner pad plate 11, a rotation member 42 coupled to the ball nut 41, a gear assembly 50 connected to the rotation member 42, and a driving motor 60 connected to the gear assembly 50.

The ball nut 41 is mounted inside the body 21 such that it can move back and forth in a restricted rotation state. The structure to restrict rotation of the ball nut 41 may be implemented in a manner in which the outer surface of the pressing member and the inner surface of the body 21 coupled thereto have polygonal shapes or in a manner in which a key and a key-shaped guide member (not shown) are mounted in the outer surface of the pressing member and the inner surface of the body 21. The ball nut 41 transfers rotational force to the disc 10 while contacting the inner pad plate 11.

The rotation member 42 is mounted rotatably in the body 21 such that the rotation member 42 is disposed in parallel to a movement direction of the ball nut 41. When a ball screw is used as the rotation member 42, the rotation member 42 and the ball nut 41 are provided with grooves 43 and 44 where a plurality of balls moves. The rotation member 42 may be a roller screw, instead of the ball screw.

Figure 2:
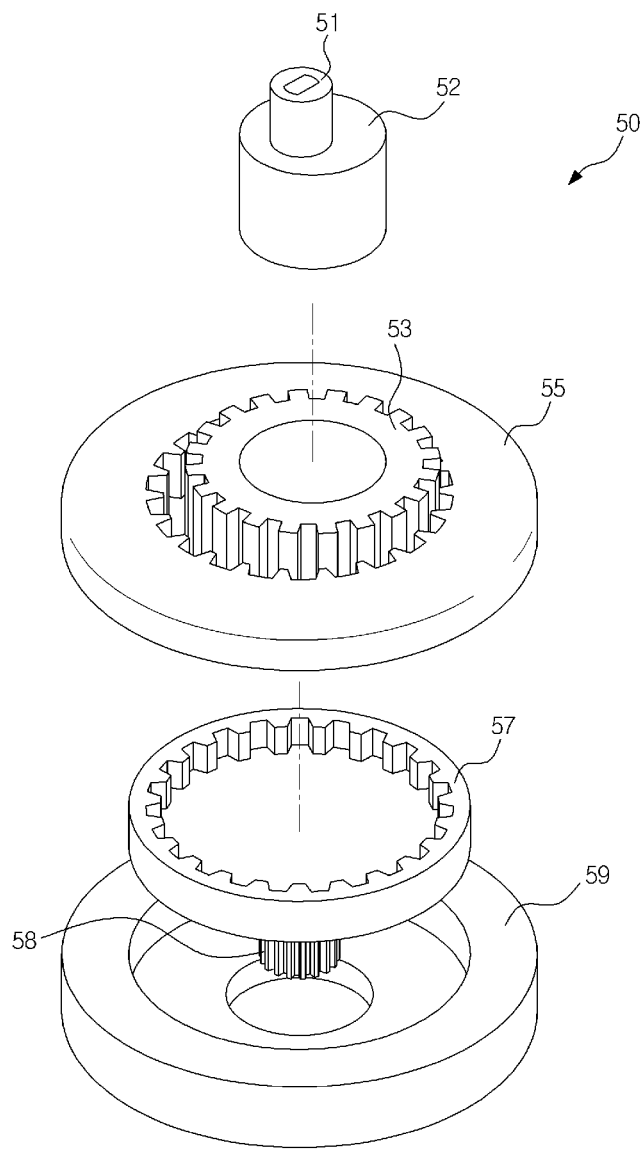
FIG. 2 is a partial exploded view illustrating a cycloidal gear in an electromechanical brake according to one embodiment of the present invention.

As shown in FIG. 2, the gear assembly 50 includes an input shaft 51 connected to the driving motor 60, an external gear 53 eccentrically coupled to the input shaft 51, a stationary internal gear 55 cycloidal-meshed with the external gear 53 and a rotational internal gear 57. The rotational internal gear 57 includes an output shaft 58 in the center thereof and the output shaft 58 is connected to the rotation member 42.

The input shaft 51 includes an eccentric cam 52 and is coupled to the external gear 53. Accordingly, the external gear 53 that revolves based on driving force of the driving motor 60 eccentrically rotates, based on the eccentric cam 52.

Figure 3:
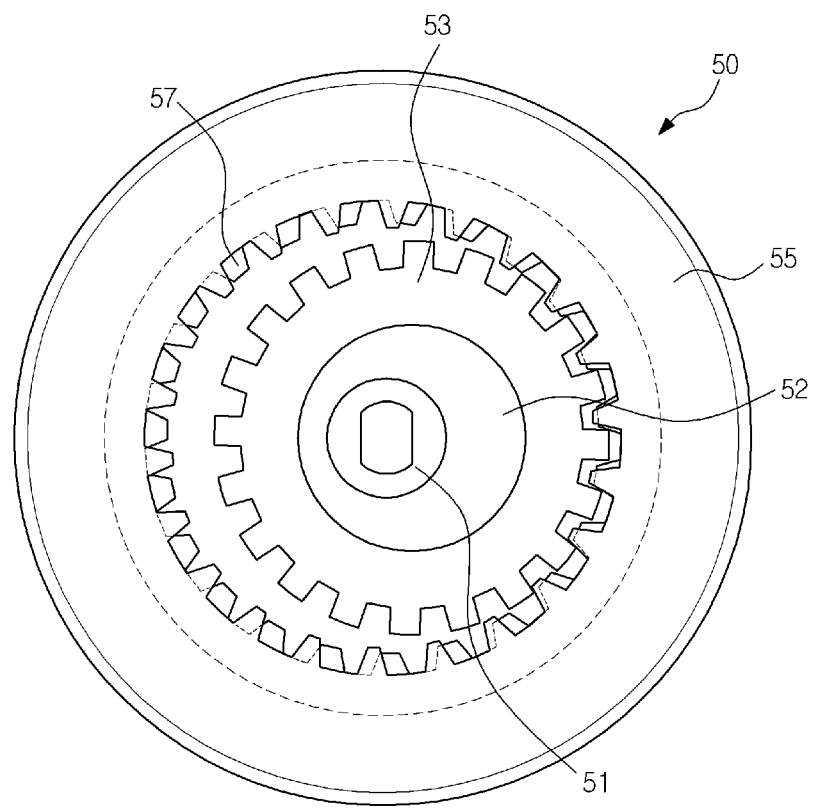
FIG. 3 is a plan view of FIG. 2.
Figure 4:
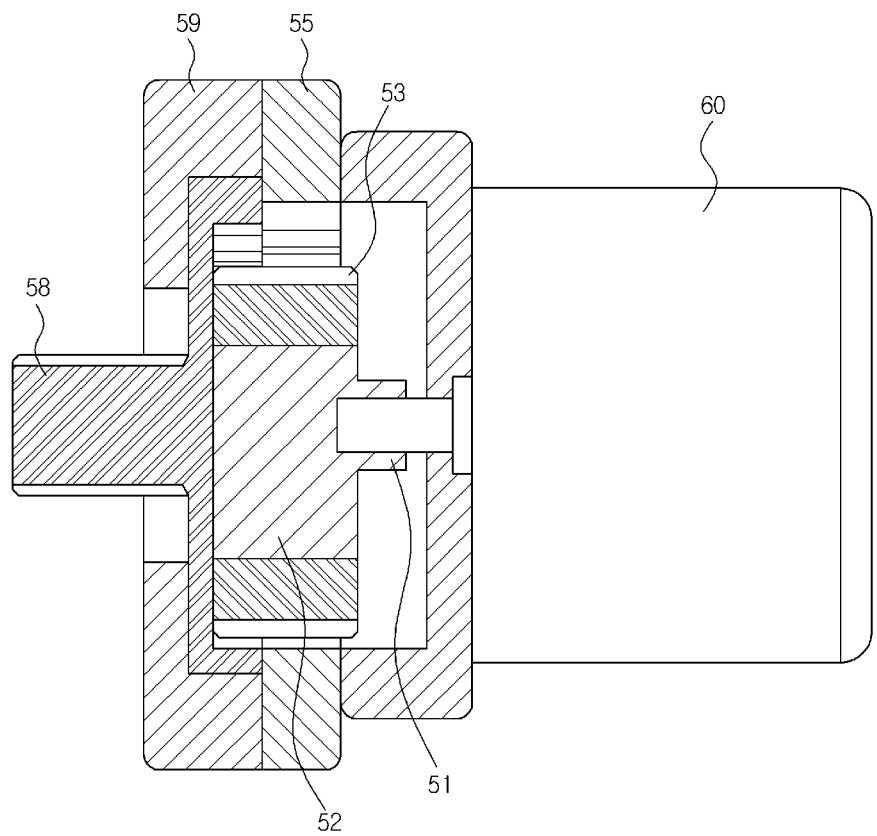
FIG. 4 is a partial sectional view of FIG. 2.

As shown in FIGS. 3 and 4, the stationary internal gear 55 and the rotational internal gear 57 are meshed with the external gear 53 in the form of a cycloidal gear. In this case, the stationary internal gear 55 has the same radius as the rotational internal gear 57, but the tooth number of the rotational internal gear 57 is one less than that of the stationary internal gear 55, and the rotational internal gear 57 is rotatably mounted in the stationary internal gear 55 and a stationary internal gear housing 59. Accordingly, the external gear 53 meshed with both the stationary internal gear 55 and the rotational internal gear 57 outputs a desired constant speed reduction ratio, while revolving and rotating along the internal gears 55 and 57, and the rotational internal gear 57 transfers the output speed reduction ratio and torque through the output shaft 58 to the rotation member 42.

The electromechanical brake including the gear assembly as described above is compact, as compared to a decelerator of the related art using a sun gear and a plurality of satellite gears, and may adopt a ball-screw type of pressing member that does not require an self-locking apparatus, instead of spindles of the related art having self-locking property, since it is not reversible, thus reducing noise while improving efficiency and response. Also, the necessity of applying current to the motor is eliminated during braking operation due to irreversibleness and lifespan of the motor is thus greatly lengthened.

As apparent from the fore-going, the electromechanical brake according to embodiments of the present invention is compact since it reduces speed using an internal gear that eccentrically rotates, and a fixed external gear and a rotational external gear meshed with the internal gear such that the internal gear revolves and rotates, and increases response and efficiency using a ball screw as a pressing member, since the pressing member is irreversible. In particular, irreversibleness eliminates a necessity of applying current to the motor during braking, thus significantly extending the lifespan of the motor.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electromechanical brake comprising:
   a pair of pad plates provided with a friction pad to apply pressure to a disc;
   a carrier to support the pad plates;
   a caliper housing supported movably back and forth on the carrier to apply pressure to the pad plates; and
   a presser to apply pressure to the pad plates,
   wherein the presser comprises:
   a pressing member to apply pressure to one of the pad plates;
   a driving motor to operate the pressing member;
   a gear assembly disposed between the driving motor and the pressing member to transfer rotational force of the driving motor to the pressing member,
   wherein the gear assembly comprises:
   an input shaft connected to the motor;
   an external gear coupled to the input shaft such that the external gear eccentrically rotates; and
   a stationary internal gear and a rotational internal gear meshed with the external gear such that the external gear revolves, while rotating,
   wherein the rotational internal gear comprises an output shaft in the center thereof and the output shaft is connected to the pressing member, and
   wherein the rotational internal gear has the same diameter as that of the stationary internal gear and has a smaller tooth number than that of the stationary internal gear.

2. The electromechanical brake according to claim 1, wherein the gear assembly further comprises a stationary internal gear housing coupled to the stationary internal gear, and the rotational internal gear is mounted rotatably between the stationary internal gear and the stationary internal gear housing.

3. The electromechanical brake according to claim 1 or claim 2, wherein the pressing member further comprises:
   a ball nut mounted movably back and forth on the caliper housing; and
   a rotational member spirally coupled to the ball nut and connected to the output shaft of the rotational internal gear.

* * * * *